Patented Sept. 24, 1935

2,015,257

UNITED STATES PATENT OFFICE 2,015,257

CHEESE FILLING FOR BAKERY PRODUCTS

Forest H. Clickner, Chicago, Ill., assignor to Kraft-Phenix Cheese Corporation, Chicago, Ill., a corporation of Delaware No Drawing. Application May 12, 1934, Serial No. 725,347

14 Claims. (Cl. 99—11)

My invention relates to cheese fillings for bakery products, such as wafers, cheese biscuits, and the like.

Such fillings have for a long time been placed in bakery goods, but have not been satisfactory for various reasons.

An important defect in the past has been the tendency of such fillings to saponify in the presence of the alkalies of the panified goods, giving a soapy flavor to the entire product and greatly reducing its edibility.

I have deduced that if a satisfactory cheese filling could be produced which is substantially free of moisture, the tendency of such materials to saponify would be substantially eliminated. After considerable study and experimentation, I have succeeded in preparing such a substantially water-free cheese filling which eminently fills all commercial requirements, and have confirmed my theory, since my said product has shown no tendency to saponify in the finished bakery goods.

In its preferred embodiment my improved compound comprises a homogeneous mixture of a smooth, relatively anhydrous fat which is solid at room temperatures, such as "plastic butter", substantially anhydrous cheese powder, skim-milk powder, and a substantially dry starch, such as redried corn-starch. An important characteristic of my invention is that the final product contains not more than about one per cent of moisture, and preferably is as nearly anhydrous as is possible.

A preferred formula embodying my invention is as follows:

Example

| | Pounds |
|---|---|
| (1) "Plastic butter", 92° F. melting point | 37 |
| (2) Dry cheese powder | 28 |
| (3) Skim milk powder | 10 |
| (4) Redried cornstarch | 25 |
| Total | 100 |

It will be understood by those skilled in the art that "plastic butter" is a term commonly used in this art to designate a hydrogenated oil substantially free from moisture, for example, cottonseed oil, which is solid but relatively soft at room temperature.

Ingredients (1) and (2) may be varied in proportion within wide limits, inasmuch as these constituents are practically anhydrous, the cheese powder containing not more than about one per cent of moisture, while the fat is substantially anhydrous. Thus, the cheese powder may vary between 15 and 65 per cent of the total mix, and the fat will vary accordingly.

The fat renders the final product smooth and creamy in texture and facilitates whipping. The milk powder provides body and flavor, while avoiding excessive sweetness, which would be undesirable in a product of this nature. A function of the cornstarch, which contains not more than one per cent of moisture, is to serve as a non-sweetening stiffener.

The ingredients listed above may be mixed by whipping cold in a Hobart or other suitable type of mixer until a substantially smooth product of uniform texture is obtained.

This product may be used for filling bakery products, such as wafers, biscuits, rolls, etc. in a manner well known to those skilled in the bakery art. It will be obvious to one skilled in the art that the term "filling" as used here means a substance applied to either the inside or outside of a baked article.

The cheese powder, ingredient (2), which contains about 3 per cent and preferably not more than one per cent of moisture, may be prepared by dividing a snappy, aged American cheese of good quality into relatively small portions and drying the same in an oven or drying tunnel at a moderate temperature, or it may be produced by the method described in my co-pending application, Serial No. 725,346, filed May 12, 1934.

Briefly summarizing, said method consists in comminuting an aged American cheese of low moisture content, heating to a temperature of about 165° F., preferably with direct saturated steam, and adding water to bring the moisture content up to about 70 per cent, said water containing enough citric or other acid to produce a pH value in the dried cheese of about 5.0. Acid whey or milk may be used in lieu of the acidified water. The mixture is vigorously agitated to render uniform, is preferably homogenized, and while still at an elevated temperature is forced to the spray heads of a spray-drying apparatus, producing a powdered product having a moisture content preferably below one per cent and an acidity of about pH 5.0. The acidity is preferably adjusted as indicated, in order to neutralize the free alkali in the baked goods and thus still further reduce the possibility of saponification.

The cheese powder prepared as described above will have a moisture content not substantially higher than 3 per cent, as described in said co-pending application, and may be, and preferably is, below 1 per cent. Such a cheese will retain a distinct and pleasing cheese flavor for a long period of time without any tendency to saponify or rancidify to yield a disagreeable flavor.

Various modifications coming within the spirit of my invention will doubtless suggest themselves to those skilled in the art. Hence, I do not wish to be limited to the specific embodiments disclosed above or uses mentioned, but intend that the scope of my invention shall be determined from the appended claims, which are to be interpreted as broadly as the state of the art will permit.

I claim as my invention:

1. A food compound useful as a filling for bakery products, comprising a dry edible fat which is solid at room temperature, a comminuted, substantially anhydrous cheese, and a stiffening filler, said compound containing not more than about one per cent of moisture.

2. A food compound useful as a filling for bakery products, comprising a dry edible fat which is solid at room temperature, a comminuted, substantially anhydrous cheese, and a substantially non-sweetening stiffening filler, said compound containing not more than about one per cent of moisture.

3. A food compound useful as a filling for bakery products, comprising a substantially homogeneous mixture of "plastic butter", a comminuted, substantially anhydrous cheese, skim milk powder, and cornstarch, said compound containing not more than about one per cent of moisture.

4. A food compound useful as a filling for bakery products, consisting of the following ingredients in approximately the proportions set forth, and containing not more than about one per cent of moisture:

| | Parts by weight |
|---|---|
| Plastic butter, 92° F. melting point | 37 |
| Dry cheese powder | 28 |
| Skim milk powder | 10 |
| Redried cornstarch | 25 |

5. A food compound as defined in claim 1, wherein the cheese has a pH value of about 5.0.

6. In combination, a substantially dry panified food product having normally alkali available for saponification and a substantially anhydrous filler added after the baking of said panified product for imparting a cheese flavor, comprising an edible fat substantially free from moisture, a comminuted, substantially anhydrous cheese, and a dry stiffening filler.

7. In combination, a substantially dry panified food product having normally alkali available for saponification and a substantially anhydrous filler added after the baking of said panified product for imparting a cheese flavor, comprising an edible fat substantially free from moisture which is solid at room temperature, a comminuted, substantially anhydrous cheese, and a dry, stiffening filler.

8. In combination, a substantially dry panified food product having normally alkali available for saponification and a substantially anhydrous filler added after the baking of said panified product for imparting a cheese flavor, comprising an edible fat substantially free from moisture which is solid at room temperature, a comminuted, substantially anhydrous cheese, and a dry, substantially non-sweetening stiffening filler.

9. In combination, a substantially dry panified food product having normally alkali available for saponification and a substantially anhydrous filler added after the baking of said panified product for imparting a cheese flavor, comprising a substantially homogeneous mixture of "plastic butter", a comminuted, substantially anhydrous cheese, dry skim milk powder, and cornstarch.

10. In combination, a substantially dry panified food product having normally alkali available for saponification and an added filler composition containing not more than about one per cent moisture for imparting a cheese flavor, said filler consisting of the following ingredients in approximately the proportions set forth:

| | Parts by weight |
|---|---|
| Plastic butter, 92° F. melting point | 37 |
| Dry cheese powder | 28 |
| Skim milk powder | 10 |
| Redried cornstarch | 25 |

11. A product as defined in claim 6, wherein the cheese has a pH value of about 5.0.

12. A product as defined in claim 7, wherein the cheese has a pH value of about 5.0.

13. A product as defined in claim 9, wherein the cheese has a pH value of about 5.0.

14. In combination, a substantially dry panified food product having normally alkali available for saponification, and a filler added after the baking of said panified product for imparting a cheese flavor, comprising a cheese powder, an edible fat and a stiffening agent, said filler containing not substantially more than about 3 per cent of moisture.

FOREST H. CLICKNER.